J. O'NEIL.
GAME TRAP.
APPLICATION FILED JAN. 26, 1921.
1,390,214.
Patented Sept. 6, 1921.
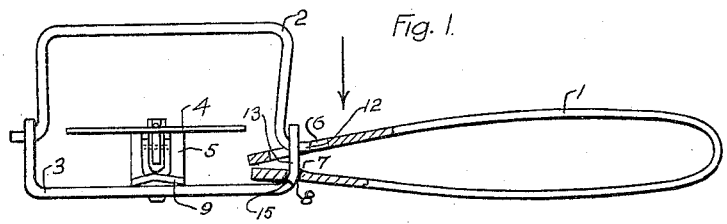
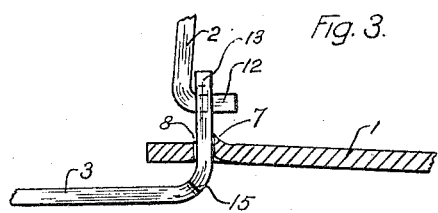
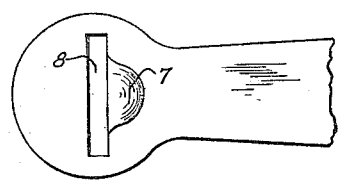
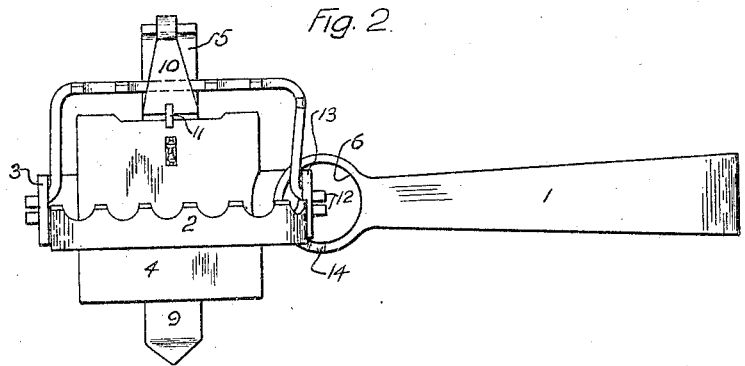
INVENTOR
Jerry O'Neil
BY
Harry L. Duncan
ATTORNEY

UNITED STATES PATENT OFFICE.

JEREMIAH O'NEIL, OF SHERRILL, NEW YORK, ASSIGNOR TO ONEIDA COMMUNITY, LIMITED, OF ONEIDA, NEW YORK, A CORPORATION OF NEW YORK.

GAME-TRAP.

1,390,214.   Specification of Letters Patent.   Patented Sept. 6, 1921.

Application filed January 26, 1921. Serial No. 440,126.

*To all whom it may concern:*

Be it known that I, JEREMIAH O'NEIL, a citizen of the United States, and resident of Sherrill, county of Oneida, and State of New York, have made a new and useful Invention Relating to Game-Traps, of which the following is a specification, taken in connection with the accompanying drawing, which forms part of the same.

This invention relates especially to steel or jaw game traps of the type used for rabbits in Australia and in which the trap spring is maintained in a substantially straight position in line with the trap frame or base as is preferred in this practice. The trap spring which may be of general U-form and provided at its upper free end with a spring bow or eye may have a relatively narrow or constricted aperture at its lower end properly shaped for engagement with the frame extension or other jaw post, to which one end of each of the trap jaws may be pivoted. By forming this lower spring aperture or slot so as to fit relatively close with respect to the jaw post, which may be of rectangular section undesirable upward tilting of the U-bend of the trap spring may be prevented when the trap is set, so that the spring does not engage or strike on the usual projecting pintles or pivotal portions of the jaws. For this purpose it is sometimes desirable to have the trap spring formed with one or more alining detents or projections adjacent the spring aperture or slot, so as to engage the jaw post and frame member and positively prevent undesirable or upward tilting in setting the trap.

In the accompanying drawings showing in a somewhat diagrammatic way an illustrative embodiment of this invention—

Figure 1 is a side elevation of the trap parts being shown in section.

Fig. 2 is a top view thereof showing one of the jaws locked down by the trigger in set position.

Fig. 3 is an enlarged detail side view showing the jaw post and adjacent parts; and Fig. 4 is a corresponding top view of the spring end.

The trap jaws 2, may have any desired form and construction and may for example have serrated or notched meeting faces as is shown in Fig. 2. These trap jaws may have integral pintles or pivotal portions 12 projecting through suitable bearing holes in the integral or other jaw posts such as 13, which may if desired be formed by bending up the end portions of the trap frame or base 3. This frame may be connected to the cross-member 9, extending if desired beneath the free jaw when in set position and having its other end 5 arranged to pivotally support the latch or pivot 10, which may engage in a catch or notch 11 on the trap pan 4, of any suitable shape and construction pivoted to the cross-member or frame in any suitable way.

The trap spring 1 formed of tempered sheet steel or the like is preferably formed at its free upper end with a spring eye or bow 6, to accommodate the trap jaws and jaw post while the lower end of the spring is preferably provided with a constricted spring aperture or slot 8, which fits fairly tightly about the coöperating jaw post 13, so as to preferably prevent extended or substantial angular movement of the spring out of line with the trap frame. The sides of this spring slot or portions thereof may also fit sufficiently tightly around the jaw post, so as to prevent undesirable upward tilting of the U-bend of the spring in setting the trap and for some purposes it is desirable to have one or more projecting portions or detents such as 7, which may be located adjacent the central portion of this spring slot on the upper side thereof as shown in Fig. 4 so as to project upwardly somewhat beyond the general adjacent surface of the lower spring end as is shown in Fig. 3 where of course the amount of clearance is somewhat exaggerated in the drawing. Shoulders such as 15 may be formed on the lower parts of the jaw post, so as to positively limit the downward movement of the lower spring end which is shown somewhat raised from its normal lower position in Fig. 3. Of course, the alining detent 7, may be formed in any suitable way as by punching or stamping at the same time that the jaw slot 8 is formed in the spring end if desired. This arrangement allows the spring to tilt downward at its U-bend with respect to the jaw post and frame but these alining projections by their contact with the jaw post prevent the U-bend of the spring from swinging upward to an excessive extent, so that when forcing down the free upper end of the spring in setting the trap as is indicated by the arrow in Fig. 1, the edge of the spring eye or bow cannot come into undesirable contact with the projecting pintles 12, so as to prevent the setting of the trap. Of course, the spring bow may be given a slight side twist so as to be somewhat lower where it engages the free or loose jaw of the trap or a localized depression such as 14, may be formed in the spring bow at this point as is shown in Fig. 2, so that the free jaw can drop down into the desired level position and if desired rest on or adjacent the reduced end 9 of the crossmember.

This invention has been described in connection with a number of illustrative embodiments, forms, parts, proportions, sizes, materials, and methods of connection, operation and use, to the details of which disclosure the invention is not of course to be limited, since what is claimed as new and what is desired to be secured by Letters Patent is set forth in the appended claims.

I claim:—

1. The game trap comprising a frame having integral substantially rectangularly sectioned jaw posts projecting upwardly therefrom, trap jaws having pintle portions projecting outward in opposite directions through said jaw posts and a coöperating U-shaped trap spring of sheet metal formed at its upper end with a substantially circular bow to encircle the jaw post and adjacent parts of the jaws and having its lower end formed with a restricted spring slot having sides adapted to closely coöperate with the sides of the corresponding shouldered jaw post and having an upwardly projecting alining detent adjacent the upper side of said spring slot to prevent undesirable upward tilting of the U-bend of the trap spring and consequent engagement between the jaw pintles and spring bow when the trap is being set.

2. The game trap comprising a frame having integral substantially rectangularly sectioned jaw posts projecting upwardly therefrom, trap jaws having pintle portions projecting through said jaw posts and a coöperating U-shaped trap spring formed at its upper end with a bow to encircle the jaw post and adjacent parts of the jaws and having its lower end formed with a transversely extending restricted spring slot having sides adapted to closely coöperate with the sides of the corresponding jaw post to prevent undesirable upward tilting of the U-bend of the trap spring and consequent engagement between the jaw pintles and spring bow when the trap is being set.

3. The game trap comprising a frame having upwardly projecting integral jaw posts, trap jaws having pintle portions projecting outward in opposite directions through said jaw posts and a coöperating U-shaped trap spring formed at its upper end with a spring bow to encircle the jaw post and adjacent parts of the jaws and having its lower end formed with a restricted spring aperture adapted to closely coöperate with the sides of the corresponding jaw post and having an upwardly projecting alining detent adjacent the upper side of said spring aperture to prevent undesirable upward tilting of the U-bend of the trap spring and consequent engagement between the jaw pintles and spring bow when the trap is being set.

4. The game trap comprising a frame having upwardly projecting jaw posts, trap jaws having pintle portions projecting through said jaw posts and a coöperating U-shaped trap spring formed at its upper end with a spring bow to encircle the jaw post and adjacent parts of the jaws and having its lower end formed with a restricted spring aperture adapted to closely coöperate with the sides of the corresponding jaw post to prevent undesirable tilting of the U-bend of the trap spring and consequent engagement between the jaw pintles and spring bow when the trap is being set.

5. The game trap comprising a frame having jaw posts projecting upwardly therefrom, trap jaws having pintle portions projecting through said jaw posts and a coöperating U-shaped trap spring formed at its upper end with a substantially circular bow to encircle the jaw post and adjacent parts of the jaws and having its lower end formed with a spring aperture and coöperating alining means on the lower end of said trap spring and the coöperating jaw post to prevent undesirable engagement between the jaw pintles and spring bow when the trap is being set.

6. The U-shaped trap spring of sheet metal formed with a substantially circular bow in its free upper end and having its lower end formed with a restricted spring slot having sides adapted to closely coöperate with the sides of a coöperating jaw post and having an upwardly projecting alining detent adjacent the upper side of said spring slot to prevent undesirable upward tilting of the U-bend of the trap spring and consequent engagement between the coöperating jaw pintles and spring bow when the trap is being set.

7. The U-shaped trap spring formed with a bow in its free upper end and having its lower end formed with a restricted spring aperture adapted to closely coöperate with the coöperating jaw post and having an upwardly projecting alining detent adjacent the upper side of said spring aperture to prevent undesirable upward tilting of the U-bend of the trap spring and consequent engagement between the coöperating jaw pintles and spring bow when the trap is being set.

JERRY O'NEIL.